Patented Feb. 4, 1936

2,029,962

UNITED STATES PATENT OFFICE 2,029,962

PROCESS FOR PURIFICATION OF POTABLE AND POLLUTED WATERS

Oliver M. Urbain and William R. Stemen, Columbus, Ohio, assignors to Charles H. Lewis, Harpster, Ohio No Drawing. Application October 27, 1934, Serial No. 750,386

6 Claims. (Cl. 210—23)

The process of the present invention relates to the purification of both potable and polluted waters. By potable waters is meant water which is being purified for domestic consumption by the inhabitants of a community.

In the purification of potable water three factors are of prime importance, namely, first, sanitary quality, i. e., content of bacteria, second, tastes and odors, and third, hardness.

The present invention is principally concerned with the removal of tastes and odors.

The tastes and odors in potable water are due to the presence in the water of organic compounds which have their origin in decomposing organic matter or the passage of industrial wastes into the original watershed. Bacteria, algæ, ameba and many other forms of animal and vegetable life are responsible for the tastes and odors due to the decomposition of organic matter which we find in our potable water supplies. Many public water supplies are also contaminated with phenols. Such is the case in many cities located on the Ohio River and the Great Lakes. Even a few hundredths of 1.0 p. p. m. of phenols will result in a bad taste and odor in the finished water which has been chlorinated. These tastes and odors are due in large part to chlorophenols and chlorocresols.

For the purpose of removing tastes and odors in potable water supplies, activated carbons are now employed. The powdered carbon is added to the water before coagulation, and, after its action is complete, is coagulated from the water with aluminum sulfate and like coagulants. The activated carbons used for this purpose are quite expensive and constitute an important item in the final costs of purification.

The present invention contemplates the use of a material which is not only much less expensive but which also will remove considerably more of the taste and odor producing compounds per unit of weight, and accomplish this result in less time than the activated carbons now employed for the purpose. It is more efficient for the purpose from any angle which may be considered.

In the purification of polluted water as distinguished from potable water, the requirements are quite different. In this case the problem involved is one applied to the removal of organic compounds which are in true solution, and which are responsible for the B. O. D. (biochemical oxygen demand) of a polluted water after the suspended matter and the colloidal matter has been removed. This B. O. D. varies greatly for the different wastes. The B. O. D. of a few representative polluted liquids, after the removal of the suspended and colloidal matter, are given as follows:—

| Waste | 10-day B. O. D. 20° C. |
|---|---|
| Dilute sewage | 32 |
| Strawboard waste | 370 |
| Tannery waste | 340 |
| Creamery waste | 220 |
| Concentrated sewage | 110 |
| Packing house waste | 2200 |

The elimination of the B.O.D. of the true solution fraction of the various wastes is a problem of considerable magnitude. It is to the solution of this problem in the field of polluted liquids and to the problem of eliminating the tastes and odors from potable water supplies that the present invention is directed. The applications of the process are somewhat different, that is, the process is varied to meet varying conditions.

The basic material employed in the process consists of chlorinated coal. This material is the base material used for the purposes enumerated. The constituents of the base material which actually do the work are the chlorine derivatives of coal, and their derivatives. Therefore, when the words "chlorinated coal" are used in this specification and the claims it will be understood that they are inclusive of the "chlorine derivatives of coal, and their derivatives."

In the preparation of the base material we employ powdered coal such as sub-bituminous, bituminous or anthracite coal, powdered to pass through a 5 mesh to 20 mesh screen. The coal is chlorinated at a temperature varying from room temperature to 125° C. by passing chlorine gas through the mass. Above 125° C. the chlorine compounds decompose, so care should be taken to keep the temperature below this critical point. In this chlorination process, catalysts such as iron, iodine, sulfur or lead may to advantage be employed, though their use is not essential. The temperature of the coal mass rises somewhat during chlorination. Hydrochloric acid gas and water vapor are copiously given off. Smaller quantities of carbon oxides, hydrocarbons and chlorinated hydrocarbons are given off.

The product of such chlorination contains substantial amounts of chlorine by weight. The percentage of chlorine depends upon the following factors:

1—Fineness of the coal
2—Nature or kind of coal
3—Temperature of chlorination
4—Pressure
5—Time of chlorination The finer the coal, the higher the temperature up to 125° C., the higher the pressure, and the longer the time of contact to complete chlorination, the higher will be the percentage of chlorine in the finished product. The chlorinated coal is more porous than the original coal, therefore it has a greater surface exposure. The fragility of the chlorinated coal is not appreciably different from that of the original coal when hard coals are employed. When soft coals are employed the chlorinated product is much harder than the original coal. The chlorination should be carried out in an apparatus made of materials capable of withstanding the action of hydrochloric acid.

The action of the chlorine on the coal may be expressed by the following factors:

1—Chlorine substitutes for hydrogen in the hydrocarbon part of the so-called coal conglomerate.
2—Chlorine oxidizes certain groupings and opens up the ring structures.
3—Chlorine adds to the unsaturated points in the coal.
4—Chlorine adds to the unsaturated points made under #2.
5—Chlorine renders soluble the inactive inorganic constituents (coal ash) of the coal, such as iron and its compounds, sulfur and the alkaline earth metal compounds, which, upon removal by washing, open up the coal structure, increasing the active surface of the mass.
6—Chlorine activates the surface of the mass by shifting the adsorbed and absorbed gases.

In the treatment of water, the mode of application may be by a filter arrangement or by adding the material in a finely powdered condition directly to the water to be treated, followed by adequate agitation and subsequent coagulation. If used as a filter, the particle size of the material should be from 5 mesh to 10 mesh; if added directly to the water the fineness may be such that the particles will pass through a 40 mesh screen.

By using chlorinated coal as a filter material, one not only obtains a splendid mechanical filter but an extremely active chemical filter as well. Chlorinated coal is particularly active in the removal of organic acids, alcohols, aldehydes, amines, ketones, mercaptans, nitriles, phenols, cresols, sulfides, sulfones, sulfoxides and the substituted products of all of these groups.

The mechanism of the removal of the organic compounds by chlorinated coal, are as follows:—

1—Sorption
2—Metathesis
3—Addition (chemical)

When chlorinated coal is employed in a filter it may, upon exhaustion, be regenerated by back washing with chlorine water, or by passing gaseous chlorine through the filter.

When used as a filter a time period of contact of approximately 20 minutes will be found adequate. The filter may constitute the last step in a complete purification treatment. The size of the filter is of no importance so long as a suitable time period of contact is provided for.

When used in the powdered form, the chlorinated coal is added just ahead of the coagulation step and given approximately 15 minutes of agitation. When used in potable water purification, the chlorinated coal is added before or during the coagulation step and agitated for about fifteen (15) minutes.

As an example of the efficiency of this material in treating polluted water, the following table is given:

A quantity of municipal sewage was chemically treated to remove only colloids and suspended matter. The effluent containing the organic matter in solution was adjusted to pH 8.0 and filtered. 400 c.c. samples were treated with 10 grams of chlorinated coal and agitated for varying time periods, and the B.O.D. determined on the effluents from this step. Results were as follows:—

| Time | 10-day B. O. D. | Percent reduction |
|---|---|---|
| Blank True solution fraction | 72.5 | 00.0 |
| 5 minutes | 28.8 | 60.3 |
| 10 minutes | 21.5 | 70.3 |
| 20 minutes | 10.6 | 85.4 |

A potable water similarly treated was freed of all trace of odor and taste.

Having thus described our invention, what we claim is:—

1. In a process for the treatment of potable and polluted waters, the step of subjecting the water to the action of chlorinated coal.

2. In a process for the treatment of potable and polluted waters, the step of subjecting the water to the action of chlorine derivatives of coal.

3. A process for the purification of potable waters to remove objectionable tastes and odors comprising treating the potable water with a chlorine derivative of coal.

4. A process for removing phenols, cresols, chlorocresols, and chlorophenols from potable water supplies comprising subjecting the water for a time period not substantially in excess of 20 minutes to the action of chlorinated coal.

5. A process for removing phenols, cresols, chlorocresols, and chlorophenols from potable water supplies comprising subjecting the water for a time period not substantially in excess of 20 minutes to the action of a chlorine derivative of coal.

6. In a process for the purification of water, the step of removing organic materials in solution in the water by passing the water through a filter consisting essentially of chlorinated coal.

OLIVER M. URBAIN.
WILLIAM R. STEMEN.